Figure 1:
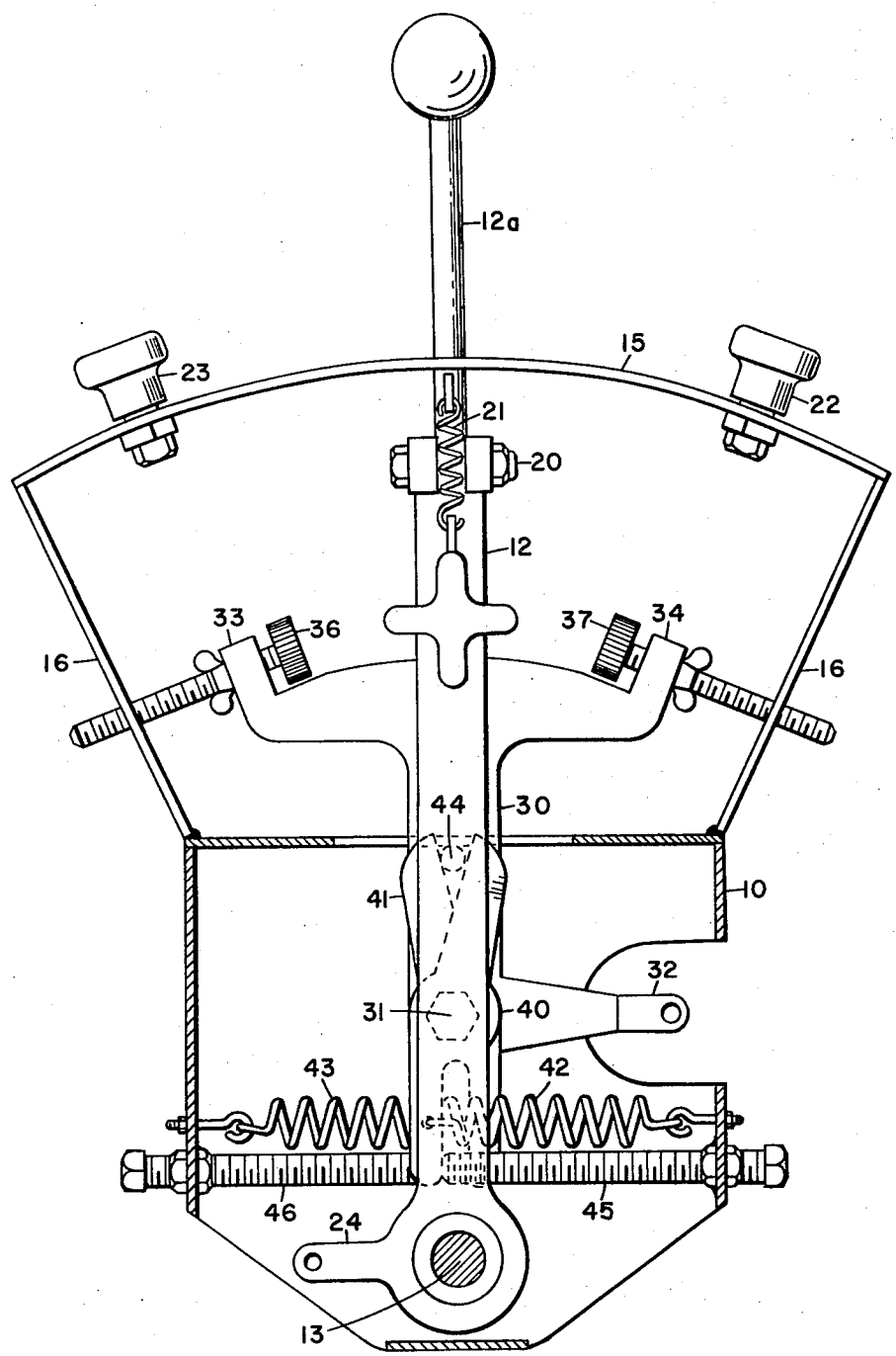

United States Patent
Kiser

[15] 3,703,836
[45] Nov. 28, 1972

[54] CONTROL APPARATUS

[72] Inventor: Warren C. Kiser, Bedford, Tex.

[73] Assignee: Shovel Supply Co., Inc., Dallas, Tex.

[22] Filed: Oct. 23, 1970

[21] Appl. No.: 83,528

[52] U.S. Cl. ................................. 74/471 R, 94/50 V
[51] Int. Cl. .............................................. G05g 9/08
[58] Field of Search ........ 74/491, 471, 470, 475, 477, 74/479, 480 R; 180/20; 94/50 V

[56] References Cited

UNITED STATES PATENTS

| | | | |
|---|---|---|---|
| 3,208,299 | 9/1965 | Leonard et al. | ............. 74/491 |
| 3,276,285 | 10/1966 | Irgens | ......................... 74/470 |
| 666,875 | 1/1901 | Reeves | ..................... 74/471 X |

Primary Examiner—Milton Kaufman
Assistant Examiner—F. D. Shoemaker
Attorney—Giles C. Clegg, Jr. and Jack A. Kanz

[57] ABSTRACT

Disclosed is an apparatus for operating two control devices with a single hand operated lever. The hand lever is pivotally mounted for movement to forward and reverse positions from a neutral position to operate one control device directly. During a portion of its pivotal movement on either side of neutral it does not influence the second control device, but upon further displacement from neutral it engages a second lever pivotally mounted in coplanar relation with the hand lever to displace the second lever from its neutral position. The second lever is resiliently biased toward its neutral position so that it returns to it as the hand lever is moved toward its neutral position.

5 Claims, 2 Drawing Figures

INVENTOR
WARREN C. KISER

ATTORNEY

CONTROL APPARATUS

This invention relates to control apparatus for consecutively activating two control functions with a single lever. More particularly it relates to a single lever control apparatus operative to activate two separate control devices and for establishing a definite relationship between the actuation of one control device with reference to another control device.

Many mechanical devices require simultaneous control of two or more independent control functions for proper operation of the device. For example, many self-powered vehicles utilizing automatic or centrifugual clutch power trains require the engine throttle to be closed before the transmission gears may be engaged. Therefore, when the throttle and transmission shift selector both utilize levers, the throttle lever must be moved to a closed position before the shift lever may be moved.

In many conventional self-powered road construction machinery vehicles, particularly packers, rollers and the like, packing force is imparted to the working surface by use of a rotating eccentric shaft passing longitudinally through the work drum. Rotation of the shaft by suitable power source causes vibration of the work drum and thus increases the force of the work drum on the surface being treated. Ordinarily such devices include a powered tractor to move the apparatus over the work surface and a work drum such as described above. When such vibrating drums are used to roll asphalt surfaces and the like, it is essential that vibration of the roller be stopped prior to stopping the tractor. If the roller is allowed to vibrate while the tractor is not moving the force generated by the eccentric shaft will cause the drum to pack the surface immediately below the drum to an excessive degree forming a depression in the asphalt pavement. It is therefore essential that a roller utilizing a vibrating shaft never be allowed to stop its forward travel while the vibrating eccentric shaft is in motion.

Conventionally, travel of the packing apparatus is controlled by a throttle lever which controls flow of fluid through a hydraulic motor used to power the tractor. The power supplied to the vibrating shaft is controlled by a separate lever which usually controls the flow of fluid to a hydraulic motor which drives the eccentric shaft. It will be observed that in order to properly operate the equipment the operator must move the power control lever for the vibrating shaft to a neutral position prior to moving the tractor throttle control lever to the closed position to insure that the vibrating shaft has ceased to vibrate prior to the time the apparatus is stopped. Frequently, however, the operator may inadvertently stop the tractor with power being supplied to the vibrating shaft. In such cases the roller will form a trench in the pavement being packed.

In accordance with the present invention control apparatus is provided which simultaneously operates two control functions. The apparatus comprises a single lever operable to engage two control rods or cables. One control cable may control the hydraulic motor for driving the tractor and the second control cable, for example, may control the hydraulic motor driving the rotating shaft of the packer described above. The control apparatus is adapted to provide continuous positive control of the drive motor cable in any position of the drive lever. However as the drive lever moves in either direction from the closed position the lever engages a second control lever which operates the power control for the vibrating shaft. In accordance with the invention the power control lever is activated and moved by the drive lever, but always reaches the neutral position before the drive lever reaches the neutral position. Therefore, flow of hydraulic fluid to the motor which powers the eccentric shaft is stopped before the drive motor is stopped.

Figure 2:
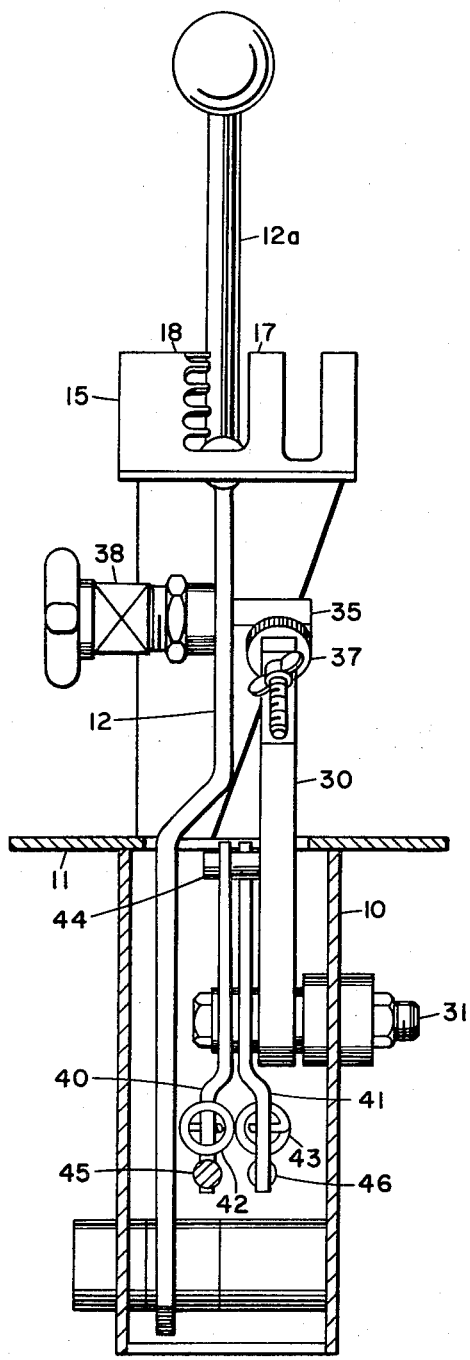

Other features and advantages of the invention will become more readily understood from the following detailed description taken in connection with the appended claims and attached drawings in which:

FIG. 1 is a side elevational view, partially in section, of the preferred embodiment of the control apparatus of the invention; and FIG. 2 is an end view of the apparatus of FIG. 1.

The preferred embodiment of the apparatus as illustrated in FIGS. 1 and 2 includes a frame or housing 10, a suitable flange 11 adapted for mounting the apparatus within a control panel or other suitable position on the vehicle to be controlled. A drive control lever 12 is pivotally mounted within the frame 10 by means of mounting pin 13 and extends from the housing 10 through flange 11.

An arcuate channel member 15 is mounted above the housing 10 by means of mounting supports 16 secured to housing 10. The upper end 12a of drive control lever 12 extends through slot 17 in the channel member 15.

In the preferred embodiment of the invention the control lever 12 is hinged below the arcuate channel member 15 to allow the top end 12a of lever 12 to be moved laterally within the confines of slot 17. As shown in FIG. 1, the hinge comprises a bolt 20 passing through aligned holes in lever 12 which receive the end of top portion 12a. The top portion 12a is biased laterally by means of spring 21. The slot 17 in channel member 15 preferably includes a series of fingers 18 along one side between which the top portion 12a of lever 12 may be urged by means of spring 21. It will thus be observed that the lever 12a may be locked in any selected position between fingers 18.

Limit means such as blocks 22 and 23 may be adjustably secured within the slot 17 to limit the travel of lever 12. The opposite end of control lever 12 is provided with a tongue 24 for attachment to suitable control cables or the like. It will thus be observed that the drive control lever 12 as described hereinabove may be used in a conventional manner as a throttle control or the like.

The embodiment illustrated in FIGS. 1 and 2 is particularly adapted for use in controlling reversible hydraulic motors. Accordingly, the position of lever 12 approximately equidistant between the limits of travel of the lever (as illustrated in FIG. 1) is the neutral position. Movement of the lever in either direction moves the control cable or rod attached to tongue 24 which controls the flow of fluid through the drive motor. Preferably the flow of hydraulic fluid is continuously variable so that the speed of the motor in either direction is dependent upon the distance the lever 12 is moved from the neutral position.

A second control lever 30 is mounted within housing 10 by means of pivot pin 31. Lever 30 is mounted substantially parallel to control lever 12 when control lever 12 is in the neutral position. Alternatively it will be observed that the second lever 30 may be mounted upon the same pivot pin 13 as that on which control lever 12 is mounted. Control lever 30 terminates in a tongue portion 32 to which may be secured any suitable control cable or similar device. The top end of second lever 30 extends through the top of housing 10 and terminates in a Y structure having spaced apart tabs 33 and 34 so that upon movement of control lever 12 in either direction pin 35 projecting from lever 12 will engage tab 33 or 34. Tabs 33 and 34 are preferably provided with adjustible pads 36 and 37 whereby the travel of lever 12 between the pads 36 and 37 may be variably adjusted as desired. Pin 35 may also be provided with retraction means 38 to withdraw pin 35 from between tabs 33 and 34 so that movement of the drive control lever 12 will not affect lever 30.

Lever 30 is maintained in the neutral position by means of retraction arms 40 and 41 pivotally mounted on pin 31 adjacent lever 30. Retraction arms 40 and 41 may be simply elongated members having apertures passing approximately through the centers thereof. The lower ends of members 40 and 41 are each attached to tension means such as springs 42 and 43. The opposite ends of the springs are attached to the housing 10. The top end of each of members 40 and 41 engage a stud 44 permanently affixed to the second lever 30. It will thus be observed that as lever 30 is moved in either direction the stud 44 engages one of the retraction arms 40 or 41 and thus tenses the spring attached to the opposite end of the arm. Stop means 45 and 46 are provided to arrest each of retraction arms 40 and 41, respectively, in the centered neutral position as illustrated in FIG. 1. It will thus be observed that as lever 30 is moved to the left as illustrated in FIG. 1 stud 44 engages the top of retraction arm 41 tensing spring 43. Retraction arm 40, however, does not follow the stud 44 since stop means 45 prevents movement of retaining member 40 in that direction. When external pressure on lever 30 is released the tension of spring 43 forces arm 41 to the right, forcing lever 30 to the neutral position. Likewise, as the lever 30 is moved to the right as shown in FIG. 1, arm 40 is urged to the right and tenses spring 42. Upon release of external pressure to the lever 30 the spring 42 causes the lever 30 to return to the original position. It should be observed that as lever 30 is moved in either direction from the centered position only one spring is tensed and the spring attached to the other retraction arm is not affected. Obviously, when external pressure is not applied to lever 30, springs 42 and 43 will insure the return of the lever 30 to the center position.

As illustrated in FIG. 1, stop means 45 and 46 may be threaded studs passing through the housing 10 to provide means for adjusting the stop position of either of the arms 40 and 41.

From the foregoing description it will be observed that control lever 12 may be moved in either direction without affecting lever 30 until pin 35 engages either pad 36 or 37. Thereafter second lever 30 follows the movement of lever 12 until lever 12 is returned to the position of original contact with the pad. When the control lever 12 is returned to that position the second lever 30 is in the neutral position and master control lever may be moved again to any point between the pads without affecting the position of lever 30. It should also be observed that any time the control lever 12 is in the centered or neutral position second lever 30 will also be in the neutral centered position, and that lever 30 will return to the centered position prior to the time control lever 12 is returned to the centered position.

It should also be observed that pin 35 may be withdrawn from between pads 36 and 37 by retraction means 38. With pin 35 withdrawn, drive control lever 12 operates entirely independently of lever 30 and lever 30 remains locked in the neutral position by retraction arms 40 and 41. Accordingly, the apparatus described may be advantageously used as a throttle control device for road construction vehicles as described above. With the pin 35 projecting between the pads 36 and 37, movement of the throttle control lever 12 also controls the second control lever 30 which controls the vibrating shaft. However, due to the unique structure of the control apparatus described, the vibrating shaft will always be stopped before the throttle control lever is returned to the neutral position.

While the invention has been described with particular reference to a specific embodiment thereof, it will be understood by those skilled in the art that various modifications and changes may be resorted to without departing from the spirit and scope of the invention as defined by the appended claims.

What is claimed is:

1. Control apparatus comprising:
   a. housing means;
   b. first and second lever means mounted for substantially coplanar oscillating movement within said housing about a neutral position;
   c. means for interconnecting said first lever means and said second lever means only during the portion of the travel of said first lever means remote from its neutral position; and
   d. means for maintaining said second lever means in a predetermined position when not interconnected with said first lever means.

2. The apparatus defined in claim 1 wherein said second lever means includes opposed tab portions at one end thereof and disposed on opposite sides of said first lever means, and said first lever means includes means for engaging said tabs.

3. The apparatus defined in claim 1 including resilient means for urging said second lever toward a position approximately equidistant from the opposite limits of travel of said second lever within said housing.

4. Control apparatus comprising:
   a. housing means;
   b. first and second lever means mounted for substantially coplanar oscillating movement within said housing;
   c. means for interconnecting said first lever means and said second lever means during a portion of the travel of said first lever means; and
   d. resilient means for urging said second lever means toward a position approximately equidistant from the opposite limits of travel of said second lever means within said housing comprising:
      i. first and second elongated members mounted for oscillating movement with said second lever means, said first elongated member being adapted to follow said second lever means as said second lever means is moved in a first direction from said position equidistant from the opposite limits of travel thereof; and said second elongated member being adapted to follow said second lever means as said second lever means is moved in the opposite direction from said position equidistant from the opposite limits of travel thereof; and ii. first and second springs secured between said first and second elongated members and said housing, respectively, for urging said second lever means toward said position equidistant from the opposite limits of travel thereof.

5. The apparatus defined in claim 4 and further including stop means associated with each of said first and second elongated members for limiting movement of said elongated members.

* * * * *